United States Patent

Glunk et al.

[15] 3,662,529

[45] May 16, 1972

[54] SWINGING BLADE ARRANGEMENT FOR MOWER ASSEMBLY

[72] Inventors: Josef Glunk; Heinz Gnadler, both of Gottmadingen, Germany

[73] Assignee: Maschinenfabrik Fahr AG, Gottmadingen, Germany

[22] Filed: Oct. 30, 1970

[21] Appl. No.: 85,504

[52] U.S. Cl. ............................................................56/295
[51] Int. Cl. .......................................................A01d 55/18
[58] Field of Search........................56/295, 6, 192, 17.5, 255

[56] References Cited

UNITED STATES PATENTS

| 2,740,249 | 4/1956 | Stearns | 56/295 |
| 3,167,899 | 2/1965 | Best | 56/295 |
| 3,389,539 | 6/1968 | Zweegers | 56/6 |
| 3,395,522 | 8/1968 | Zweegers | 56/295 |

*Primary Examiner*—Russell R. Kinsey
*Attorney*—Karl F. Ross

[57] ABSTRACT

A mower assembly of the type in which a cylindrical mower body is rotated about a vertical axis and has a downwardly and outwardly divergent frustoconical apron or plate. The plate is provided with leaf-spring mounts for the blades whereby relative movement of the blades and the support plate is permitted.

10 Claims, 5 Drawing Figures

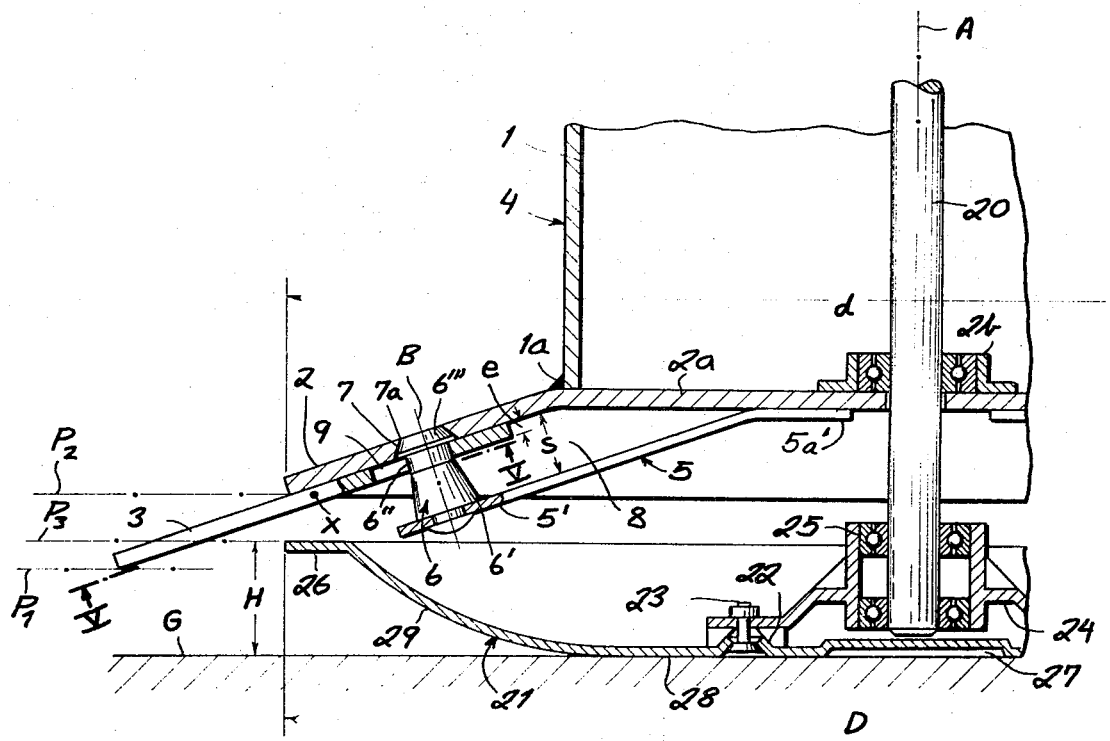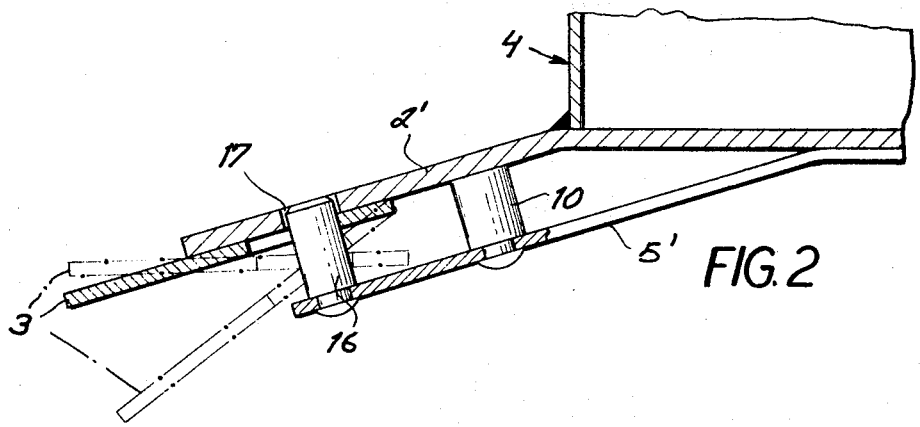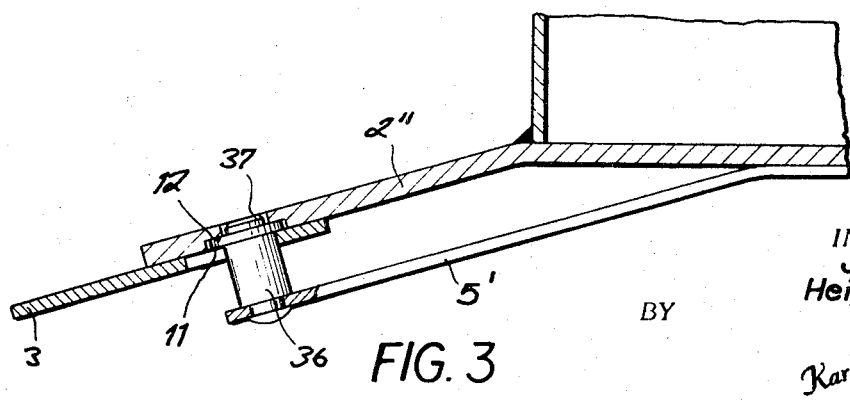

Josef Glunk
Heinz Gnadler
INVENTORS.

BY

Karl F. Ross
Attorney

SWINGING BLADE ARRANGEMENT FOR MOWER ASSEMBLY

FIELD OF THE INVENTION

Our present invention relates to a mower for lawns and the like (e.g. agricultural crops) adapted to be severed close to the ground level. More particularly, our invention relates to a rotary-drum type mower in which a plurality of blades are carried in an orbit around a substantially vertical central axis.

BACKGROUND OF THE INVENTION

Mowing machines for the cutting of agricultural grass or stalk crops, for the cutting of domestic and commercial lawns, for the elimination of unesthetic overgrown areas and for the maintenance of commercial grass areas are available in three principal types. In sickle-bar mowers, for example, a plurality of blades are mounted upon a reciprocable bar which co-operates with fixed teeth upon a support beam extending transversely to the direction of displacement of the mower to sever crop material entering gaps between the fixed teeth as the sickle bar traverses the field. Another type of mower, commonly known as a "reel mower" comprises one or more cutting drums having helical blades which co-operates with shearing bars lying along generatrices of the drum. A drum may either be coupled with the wheels of the vehicle for rotation as the vehicle or the reel support is advanced across the field, or with a prime mover, directly or via a power takeoff. As is the case with all of the mowers described above and hereinafter, reel-type mowers may be displaced across the ground manually, automatically or in a powered condition under the control of an operator. For manual displacement, the cutter is mounted upon a frame or supported having wheels or the like enabling the operator to push the mower across the plot to be maintained. The cutting member may also be mounted on an agricultural tractor as a separate implement or as a permanent fixture and may even be towed along behind a prime mover. Finally, we may mention mowers with rotary-blade assemblies wherein the blades extend approximately parallel to or along the ground surface and are swung in orbit about an upright central axis. The blades may be carried on a shaft rotatable about this axis in one mower arrangement of this type or upon a mower body, e.g. a drum having the blade members fixed beneath an apron or cutting plate at the bottom end of this drum. Two or more such assemblies are generally provided on a common support structure.

In the commonly assigned copending application Ser. No. 62,967 filed Aug. 11, 1970 and entitled MOWER, a rotary blade assembly of this type has been set forth.

In these rotary-blade arrangements and those operating with driven shafts, it has been found to be advantageous to permit swinging movement of the blade about an axis perpendicular to the longitudinal dimension of the blade and, generally, transverse to the direction of movement of the vehicle and to the cutting plane. Such free-swinging movement permits the blade to trail upon striking a rock or other hard substance during the cutting operation. In other words, swinging movement of the blade is permitted in the horizontal plane to prevent breakage of the blade, shearing of its mounting pins and overloading of the drive and transmission mechanisms. However, conventional methods of mounting the blades for swinging movement, so that centrifugal force normally holds the blades in an outwardly swung position, are not satisfactory in affording some freedom of vertical movement.

For example, a cutting blade may encounter a stone, mound of earth or like body over which it tends to ride rather than being deflected thereby. If the mounting of the blade is not somewhat yieldable, the blade will break under the load of the momentarily lifted mower. Moreover, there is also a sudden downward force upon the blade which cannot be accommodated in conventional systems. It has already been noted that these prior-art arrangements may damage the blade by bending or breaking it and may overload the drive system. We must also point out that frequently the cutting plate on which the blades are mounted is damaged because of insufficient yieldability of the blade mount. However, one cannot simply loosen the pins and the like holding the blade because considerable stress is applied to the mounting and it is equally dangerous to permit centrifugal force to cast a blade free from its support.

OBJECT OF THE INVENTION

The principal object of the present invention is to provide an improved mounting assembly for the swinging blades of a rotary blade mower of the character described.

Yet another object of this invention is to provide, in a rotary-blade mower, a mounting arrangement for the blades which will permit swinging movement under centrifugal force and the inward deflection of the blades mentioned earlier, and yet will accommodate movement of the blade in the vertical plane to eliminate or reduce the danger of blade damage and of damage to the blade plate.

It is also an object of this invention to provide a rotary-mower assembly in which the blades are mounted more economically and securely than in earlier systems.

SUMMARY OF THE INVENTION

We have discovered that these objects can be obtained, together with others which will become apparent hereinafter, by an assembly which comprises a cutter plate, preferably of downwardly and outwardly divergent frustoconical confriguration, along the interior or underside of which is affixed a plurality of blades with freedom of swinging movement. We have found that when the free swinging movement is permitted by a pin engaging an opening of the blade to permit relative movement of the pin and the blade in the axis direction of the pin, and the pin, in turn, is held with a leaf spring defining a gap with the underside of the cutter blade having a width equal to several thicknesses of the blade, both security in anchoring the blade and yieldability in the vertical direction are attained.

Advantageously, the diameter of the bore in the blade is greater than the diameter of the pin upon which the blade is mounted. Not only can the blade swing upon the pin, therefore, but it can ride in the axial direction of the pin as well. When the cutter plate is downwardly divergent and conforms to the configuration of a frustum, the cutting blade will lie along the underside of this plate. It has been found to be advantageous, moreover, to provide a frustoconical convergence or taper upon the pivot pin in the direction of the underside of the cutter plate. In this case, the opening in the blade should be large enough to clear the largest portion of the frustoconical pin.

We have also found it to be advantageous to employ a cylindrical portion of the pin between the frustoconical portion mentioned earlier and the underside of the cutter plate, the length of this cylindrical portion corresponding approximately to the thickness of the blade. During the greater part of the cutting operation, the upper surface of the blade will lie along the underside of the frustoconical cutter plate while the blade rests along the cylindrical portion of the retaining pin. Should the underside of the free end of the blade engage a rigid surface, the blade will pivot along the outer edge of the cutter plate and the opening of the blade, therefore, slides inwardly along the pin. A frustoconical convergence, however, promotes the restoring movement of the blade. Should the force be excessive, the pin will be resiliently deflected out of its recess although the head of the pin nevertheless will tend to retain the blade in place.

An important feature of our invention resides in the provision of a leaf spring for supporting each of the retaining pins and rigid therewith at one end of each pin. The other end of the pin is received in a recess or opening in the cutter plate. We have found it to be advantageous to prevent the pin from passing totally through the opening or recess and projecting out of the upper surface of the cutter plate. This is accomplished by providing a stop upon the leaf spring and/or a holder upon the pin for engagement with the complementary holder with the cutter plate. The holder may be frustoconical and, therefore, selfcentering, the frustoconical arrangement having the further advantage that any aperture on the outer surface of the cutter plate can be closed flush by the frustoconical head. To ensure that the blades will press against the inner surface of the cutter plate, we arrange the opening in the blade so that the center of gravity of the latter lies within the outline or outer periphery of the cutter plate.

DESCRIPTION OF THE DRAWING

The above and other objects, features and advantages of the present invention will become more readily apparent from the following description, reference being made to the accompanying drawing in which:

FIG. 1 is a vertical section through a portion of one embodiment of a mower according the invention;

FIG. 2 is a view similar to FIG. 1 illustrating another embodiment;

FIG. 3 is a view similar to a portion of FIG. 1 and showing a third embodiment of the invention;

SPECIFIC DESCRIPTION

Figure 4:
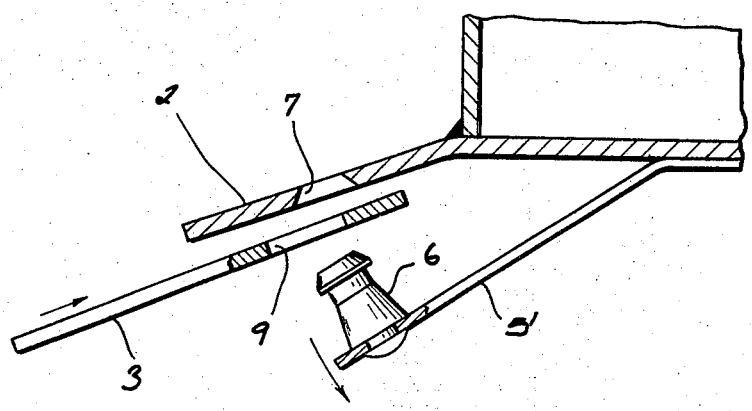
FIG. 4 is a view similar to FIG. 1 showing the parts thereof in another position.
Figure 5:
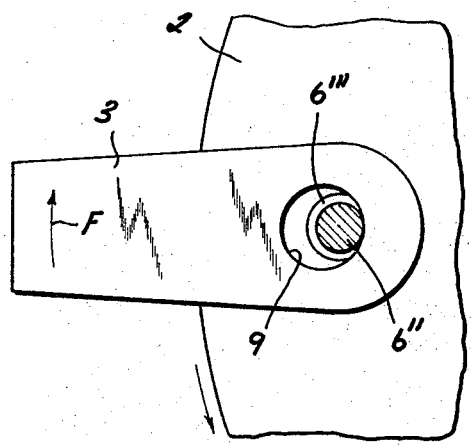
FIG. 5 is a cross section taken along the line V — V of FIG. 1.

In FIGS. 1, 4 and 5 of the drawing, we show a rotary mower assembly of the general type described in the above-identified copending application. The assembly generally comprises a mower body 4 having a cylindrical portion 1 which is welded at 1a to a frustoconical apron 2 forming the cutter blade support plate. The central web 2a of this cutter plate lies parallel to the ground surface G and carries the lower bearing 2b of the bearing assemblies rotatably journaling the cylinder 1 upon a fixed shaft 20. The shaft 20 may be one of several such shafts, each carrying a respective mower assembly, spaced along a support structure adapted to be towed and driven by a tractor or the like. The mower assemblies may be driven about their vertical axes A as described in the copending application.

Each of the mower assemblies is provided with a support skid 21 of the type described and claimed in our commonly assigned concurrently filed copending application Ser. No. 85,505 filed Oct. 30, 1970, entitled MOWING MACHINE. The skid 21 has the configuration of an upwardly concave dished disk and is provided with a plurality of angularly equispaced upwardly extending bosses 22 at which means 23 secure the disk 21 to a spider 24 carrying bearings 25 rotatably mounting the disk 21 upon the shaft 20.

The disk 21 is circular and has an outer diameter D which is at least equal to the diameter d of the outer periphery of the cutter blade support plate 2. The height H (depth) of the skid 21 is so selected that the rim 26, which lies parallel to the ground G and in a horizontal plane $P_3$, is located above the horizontal plane $P_1$ of the free ends of the blades, but below the horizontal plane $P_2$ of the outer edge of the cutter blade support plate 2. The central portion of the skid 21 is deflected somewhat inwardly at 27 in alignment with the shaft 20 to prevent wearing of the portion of the skid attached to the shaft. Outwardly of this central portion, a planar portion 28 extends over a major fraction of the cross section of the skid, e.g. between one quarter and two thirds of the surface area thereof and emerges smoothly with a lightly curved portion 29 whose radius of curvature may range between 2H and 10H.

The skid as thus described provides excellent protection of the mounting of the blades against flying rocks and debris, spreads the load of the mower over a relatively large area and is significantly less prone to wear and deterioration than earlier support structures.

The cutter blade support plate 2 carries a plurality of blades 3 which may be generally elongated as respresented in FIG. 5 or may have any other configuration known in the art. A plurality of such blades are provided upon each cutter body 4.

On the underside of the cutter blade support plate 2, but with a spacing s therefrom, we provide a holder for the blade 3 preventing the latter from dropping off the cutter plate 2. The holder 5 comprises a leaf spring 5', one end 5a' of which is secured to the web 2a and may be welded thereto. The other free end of the leaf spring 5' is formed with a frustoconical retaining pin 6 which defines a pivot axis B lying in a vertical plane generally transversely to the direction of movement of the mower and to the ground. The pin 6 has a frustoconical portion 6''' which is received in a frustoconical recess 7 formed in the cutter blade support plate 2 so that its upper surface is flush at 7a with the outer face of the cutter blade support plate. The frustoconical body 6' of the 6 converges or tapers in the direction of the inner surface of the cutter blade support plate and ends in a cylindrical portion 6' the latter having an axial length l equal to the thickness of the blade 3. Between the underside of the cutter blade support plate 2 and the upper surface of the leaf spring 5' there is formed a gap 8 in which the blade 3 is deflectable. The minimum width of this gap should be four times the thickness of the blade or s   4l. The blade 3 is provided with a bore 9 which, as shown in FIG. 5, is larger than the largest diameter of the pin 6 so that, when the leaf spring 5' is deflected downwardly (FIG. 4), a blade 3 can be inserted between the pin 6 and the opening 7, whereupon the pin is reseated in the opening (FIG. 4).

The center of gravity of the blade 3 is represented at X in FIG. 1 and lies within the outline of the cutter plate 2.

With the commencement of rotation of the body 4, centrifugal force carries the blade 3 outwardly and against the inner surface of the cutter blade support plate, the edges of opening 9 riding along the frustoconical portion of the pin 6 until the cylindrical portion thereof engages the blade. Since the center of gravity of the blade 3 lies within the cutter blade support plate 2, the blade 3 assumes the position illustrated in FIG. 1. Of course, the blade may be deflected rearwardly as represented by arrow F (FIG. 5) about the axis B defined by the pin. In addition, vertical movement of the blade is permitted as shown in dot-dash lines in FIG. 2 and little strain is applied to the cutter plate. Since the spring 5' is in force-transmitting relationship via the pin 6 with the cutter plate 2, outward force and even deflecting of the blade within the limits of space s does not apply severe stress upon the blade.

In the embodiment of FIG. 2, we have shown in dot-dash lines various positions in the vertical direction which can be assumed by the blade 3. Here, however, the pin 16 is cylindrical and engages a cylindrical bore 17 in the cutter blade support plate 2. As a stop for the leaf spring 5', therefore, we make use of a stud 10 which is likewise cylindrical. In the embodiment of FIG. 3, the pin 36 has a shoulder 11 which engages a shoulder 12 formed in the recess 37 of cutter blade support plate 2'' to form the stop. Otherwise the mounting assemblies of FIGS. 2 and 3, it will be understood, are provided in mowers identical to that shown in FIG. 1.

The improvement described and illustrated is believed to admit of many modifications within the ability of persons skilled in the art, all such modifications being considered within the spirit and scope of the invention except as limited by the appended claims.

We claim:

1. In a rotary mower, comprising in combination a mower body rotatable about a generally vertical axis; a plurality of blades mounted on said body for rotatable entrainment therewith, and retaining means mounting said blades on said body to permit freedom of movement in the vertical direction and swinging movement about respective axes transverse to the cutting direction and lying in vertical planes so as to permit the blades to swing to an inoperative position upon striking an obstruction.

2. The rotary mower defined in claim 1 wherein said body comprises a downwardly and outwardly divergent frustoconical cutter blade support plate, said retaining means including a respective pin extending perpendicular to said plate and pivotally supporting a respective blade, and a member fixed to said pin and spaced from said plate by a distance equal to a multiple to the thickness of the blade for holding same.

3. The rotary mower defined in claim 2 wherein said member is a leaf spring fixed to said body and having a free end carrying said pin.

4. The rotary mower defined in claim 3 wherein said leaf spring is spaced from said plate at said pin by a distance equal to at least four times the thickness of said blade.

5. The rotary mower defined in claim 4 wherein said pin has a frustoconical head, said plate being formed with a frustoconical recess accommodating said head.

6. The rotary mower defined in claim 5 wherein said pin has a frustoconical portion converging in the direction of said plate and spaced from said head by a cylindrical portion having an axial length approximately equal to the thickness of said blade.

7. The rotary mower defined in claim 4 wherein said pin is cylindrical and is received at least in part in a bore formed in said plate.

8. The rotary mower defined in claim 7, further comprising stop means on said pin for restricting the depth of penetration of said pin into said bore.

9. The rotary mower defined in claim 7, further comprising stop means on said leaf spring spaced from said pin for limiting the depth of penetration of said pin into said bore.

10. The rotary mower defined in claim 7 wherein each of said blades has a center of gravity lying within the outline of said plate.

* * * * *